United States Patent [19]

Liu

[11] Patent Number: 4,520,164
[45] Date of Patent: May 28, 1985

[54] BLENDS OF AROMATIC POLYCARBONATE RESINS, POLYOLEFINS AND OLEFIN COPOLYMERS, AND ACRYLATE INTERPOLYMER RESINS

[75] Inventor: Ping Y. Liu, Naperville, Ill.

[73] Assignee: General Electric Company, Mt. Vernon, Ind.

[21] Appl. No.: 452,060

[22] Filed: Dec. 22, 1982

[51] Int. Cl.³ ............................................. C08L 69/00
[52] U.S. Cl. .................................... 525/67; 524/508; 525/146; 525/902
[58] Field of Search ................... 525/67, 146, 902, 69; 524/508

[56] References Cited

U.S. PATENT DOCUMENTS

| | | | |
|---|---|---|---|
| 2,999,835 | 9/1961 | Goldberg | 260/42 |
| 3,028,365 | 4/1962 | Schnell et al. | 260/47 |
| 3,153,008 | 10/1964 | Fox | 260/47 |
| 3,169,121 | 2/1965 | Goldberg | 260/47 |
| 3,334,154 | 8/1967 | Kim | 260/860 |
| 3,431,224 | 3/1969 | Goldblum | 260/13 |
| 3,655,824 | 4/1972 | Kato et al. | 525/67 |
| 4,001,184 | 1/1977 | Scott | 260/47 XA |
| 4,034,013 | 7/1977 | Lane | 260/835 |
| 4,076,698 | 2/1978 | Anderson et al. | 526/348.6 |
| 4,096,202 | 6/1978 | Farnham et al. | 260/873 |
| 4,107,130 | 8/1978 | Gergen et al. | 260/40 R |
| 4,111,895 | 9/1978 | Gergen et al. | 260/42.18 |
| 4,123,436 | 10/1978 | Holub et al. | 260/30.8 R |
| 4,131,575 | 12/1978 | Adelmann et al. | 260/17.4 R |
| 4,180,494 | 12/1979 | Fromuth et al. | 260/40 R |
| 4,245,058 | 1/1981 | Liu | 525/146 |
| 4,260,693 | 4/1981 | Liu | 525/148 |
| 4,264,487 | 4/1981 | Fromuth et al. | 260/40 R |
| 4,299,928 | 11/1981 | Witman | 525/67 |
| 4,358,563 | 11/1982 | Quinn et al. | 525/146 |
| 4,367,310 | 1/1983 | Henton | 525/67 |

FOREIGN PATENT DOCUMENTS

| | | |
|---|---|---|
| 4645 | 10/1979 | European Pat. Off. . |
| 028753 | 5/1981 | European Pat. Off. . |
| 57-153042 | 9/1982 | Japan . |
| 57-153041 | 9/1982 | Japan . |

OTHER PUBLICATIONS

Heinert, D., "Polycarbonate Blends with Improved Critical Thickness", Dow Research Disclosure No. 20810, Aug. 1981.

Primary Examiner—Theodore E. Pertilla
Attorney, Agent, or Firm—Martin B. Barancik

[57] ABSTRACT

Thermoplastic molding compositions are described which comprise a miscible admixture of (a) an aromatic polycarbonate resin, (b) an olefinic polymer or copolymer and a minor amount of (c) a third component which is an acrylic polymer. The presence of the acrylic polymer permits the incorporation of amounts of component (b) in excess of 10 parts by weight per 100 parts by weight of (a) and (b) together to improve the stress cracking resistance without normally attendant loss in ductility.

16 Claims, No Drawings

BLENDS OF AROMATIC POLYCARBONATE RESINS, POLYOLEFINS AND OLEFIN COPOLYMERS, AND ACRYLATE INTERPOLYMER RESINS

BACKGROUND OF THE INVENTION

The aromatic carbonate polymers, also referred to as aromatic polycarbonate resins, are a well known family of available materials which enjoy a variety of applications. These polymers are characterized by good ductility in thinner sections, manifesting high impact strength in articles molded or otherwise shaped from the polymer or blends of the polymer. However, in certain applications where thicker sections are desired, the use of aromatic polycarbonates is limited because the ductility and the impact strength tend to decline with increasing average thickness. As is also known, these resins sometimes exhibit environmental stress crazing and cracking, which is a type of mechanical failure hastened by organic solvents when such solvents are brought into contact with stressed parts fabricated from the resin.

It has been proposed that the resistance of aromatic polycarbonates to environmental stress crazing and cracking can be improved by admixing the polymer with polyolefins and olefin copolymers. Blends of that kind are disclosed by Goldblum in U.S. Pat. No. 3,431,224. In practice, however, it has been found that the use of polyolefins in blends with aromatic polycarbonates is somewhat limited, especially when gasoline resistance is important. More specifically, when the polyolefins are incorporated in levels which are high enough to achieve the desired advantage of improved stress cracking/crazing resistance, there is a tendency for the molded part to delaminate due to the immiscibility or incompatibility of the two materials.

In applicant's U.S. Pat. No. 4,245,058, compositions are described comprising an aromatic polycarbonate, up to 4 parts by weight of a polyolefin per 100 parts by weight of polycarbonate and polyolefin combined, and a modifying amount of an acrylate copolymer, the latter being in an amount sufficient to induce a desirable ductile mode of failure on impact. There is no suggestion in the patent that higher amounts of polyolefin might be tolerated without shifting over into a brittle mode of failure, and no mention at all that the acrylate copolymer might enhance environmental stress cracking and crazing resistance, especially gasoline soaking resistance, of compositions comprising polycarbonates and substantial, i.e., greater than 10 parts by weight, contents of polyolefins, per 100 parts by weight of polycarbonates and polyolefins, combined.

SUMMARY OF THE INVENTION

The discovery has now been made that certain (c) acrylic polymers are effective in minor amounts to demonstrably increase the gasoline resistance of compositions comprising (a) an aromatic polycarbonate resin and (b) an olefin polymer or copolymer, while at the same time retaining desirable ductile failure mode on impact, even though the polyolefin content is increased above 10 parts by weight per 100 parts by weight of polycarbonate and polyolefin combined. Moreover, gasoline resistance is substantially improved even at levels of polyolefin as low as 10 parts per 100 parts of polycarbonate and polyolefin, combined. More specifically, such acrylic polymers can be (1) the polymerization product of acrylic comonomers, or an acrylic monomer with a diene rubber, alone, or with styrene, or alternatively, (2), a multiphase acrylic interpolymer of a first elastomeric phase and a rigid thermoplastic phase, or a mixture of (1) and (2). These are described in greater detail below.

The presence of the described acrylic polymers, even in relatively small amounts, e.g., less than 5 parts by weight, per 100 parts by weight of the total composition, permits the use of olefin polymers in widely ranging proportions. For example, compositions containing an amount of component (b) in the range of from about 10 to about 45 parts by weight per 100 parts by weight of (a) and (b) combined are typical of the invention, in contrast to prior art blends where only small amounts of polyolefin are tolerable without a concomitant tendency to become embrittled.

The amount of (b) polyolefin or olefin copolymer and (c) acrylic polymer to be used in combination with the polycarbonate varies widely, but the minimum amount is the quantity which demonstrably increases the resistance of the aromatic carbonate polymer to environmental stress cracking and crazing, particularly that caused by high aromatic no-lead gasoline to aromatic carbonate polymers under stress and then measured by an impact test. Clearly, this minimum amount will vary somewhat depending upon the specific olefin polymer or copolymer, the acrylate interpolymer and the aromatic carbonate polymer employed. However, in general, a minimum amount of above about 10 weight percent of olefin polymer or copolymer must be present, based on (a) and (b), and a minimum of about 1 weight percent of (c), based on (a), (b) and (c), should be present. The upper limit of components (b) and (c) should be the respective amounts which will allow the aromatic carbonate polymer to retain a significant number of its desirable properties. Generally, not more than about 60 weight percent of the composition of (b) and (c) will be present, based on (a), (b) and (c).

DESCRIPTION OF THE INVENTION

In general, the aromatic polycarbonate resin, component (a), useful in the practice of this invention may be selected from among those having the formula

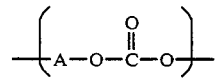

wherein A is a divalent aromatic radical of the dihydric phenol employed in the polymer producing reaction.

In preferred embodiments, the polycarbonate is more typically a resin of the formula

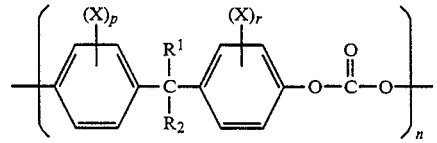

wherein $R^1$ and $R^2$ are, independently, hydrogen, (lower) alkyl or phenyl; X is, independently, (lower) alkyl, chloro, bromo or hydrogen; p and r are, independently, from 0 to 4; and n represents the total number of monomer units and is an integer at least about 30. The term "(lower) alkyl" is intended to mean a straight or branched alkyl group having from 1 to about 10, and more frequently, from 1 to about 6 carbon atoms, for example, methyl, ethyl, propyl, butyl, pentyl, hexyl, octyl, nonyl, decyl, isopropyl, isobutyl, trimethyl ethylmethyl, and so forth.

Special mention is made of polycarbonate resins devoid of substituents on the aromatic rings in the polymer chain, i.e., where p and r are zero in the above formula, although this feature is not essential to the successful practice of the invention.

By way of illustration, the terminology "aromatic polycarbonate resin" as employed in this disclosure is meant to include homopolymeric carbonates and copolymeric carbonates, as well as mixtures of the two, in which the polymer or copolymer has a molecular weight (number average) of from about 8,000 to about 200,000 or higher, but preferably from about 10,000 to about 80,000. The preferred polymers will usually be characterized by an intrinsic, i.e., inherent, viscosity within the range from about 0.30 to about 1.0 deciliters per gram (dl/g) as measured in solution in methylene chloride at 25° C. To illustrate further, such polycarbonates may be derived from dihydric phenols such as 2,2-bis(4-hydroxyphenyl) propane; bis(4-hydroxyphenyl) methane; 2,2-bis(4-hydroxy-3-methylphenyl) propane; 4,4-bis(4-hydroxyphenyl) heptane; 2,2-(3,5,3',5'-tetrachloro-4,4'-dihydroxydiphenyl) propane; 2,2-(3,5,3',5'-tetrabromo-4,4'-dihydroxydiphenyl) propane; and bis(3,3'-dichloro-4,4'-dihydroxydiphenyl) methane. Other suitable dihydric phenols are disclosed in U.S. Pat. Nos. 2,999,835; 3,028,365; 3,334,154; and 4,131,575.

The above mentioned aromatic polycarbonates can be prepared by use of known processes, such as, for instance, by reacting a dihydric phenol with a carbonate precursor, e.g., phosgene, in accordance with procedures set forth in the patent literature cited above and in U.S. Pat. Nos. 4,018,750 and 4,123,436; or by transesterification processes such as those which are disclosed in U.S. Pat. No. 3,153,008; as well as other processes known to those skilled in the art.

In addition, the aromatic polycarbonates utilized in the present invention can include polymeric derivatives of a dihydric phenol, a dicarboxylic acid and carbonic acid. A suitable procedure is described in U.S. Pat. No. 3,169,121. Branched polycarbonates, such as disclosed in U.S. Pat. No. 4,001,184; or mixtures of branched and linear polycarbonates may also be employed in the compositions.

Also encompassed within the scope of this invention are polycarbonates which have been prepared from two or more different dihydric phenols, or from a copolymer of a dihydric phenol with a glycol or acid terminated polyester, or with a dibasic acid in the event that a carbonate interpolymer or copolymer is desired.

It can thus be seen that a wide variety of aromatic polycarbonates are useful in the present kinds of compositions.

Component (b), which may be an olefin homopolymer or copolymer, is selected from among the materials well known in the art as comprising this class. Preferred for use in this invention are polymers which have been derived from olefins containing from 2 to 10 carbon atoms. Special mention is made of polyethylene, polypropylene, polyisobutylene, ethylene-propylene copolymers, ethylene-ethyl acrylate copolymers and ethylene-propylene-diene terpolymers (EPDM rubbers) in their various forms, since these are the most readily available commercially.

Methods for the preparation of these polymers, both commercial and non-commercial, are abundantly described in the literature and known to those skilled in the art. The polyethylenes can be prepared by various procedures, using anionic, cationic or free-radical initiating catalysts, with conditions varied to produce a range of molecular weights and densities and various degrees of branching or non-branching for the polymer. In one procedure, which involves free radical initiation, ethylene gas is polymerized in the presence of a peroxide initiating catalyst at a pressure between 15,000 and 40,000 psi and a temperature between 100 and 200° C., to produce a relatively low density polymer, 0.90 to 0.94 g/cm$^3$.

The polyethylene can also be prepared by low pressure processes effective to attain a polymer of higher molecular weight and higher density. In one such procedure, known as the Phillips process, ethylene is contacted in an insert solvent with a slurry of a catalyst, such as chromium oxide supported on silica-alumina, at pressures of 400 to 500 psig and temperatures of 130 to 170° C., followed by extraction of the polymer with hot solvent and purification, to produce a polyethylene product having a density between 0.96 to 0.97 g/cm$^3$.

Still other procedures are possible, such as emulsion polymerization in aqueous media in the presence of a peroxy compound, as well as suspension polymerization at low temperatures using a silver salt-peroxide redox system.

Any of the foregoing processes are utilizable to obtain polymers of ethylene suitable for use in the present compositions.

Also employable as component (b) is polypropylene, a common commercial form of which is crystalline isotactic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization generally proceeds rapidly at temperatures between 25° and 100° C. to yield a polymer in the form of a slurry of insoluble granular powder.

Copolymers of ethylene and propylene, and terpolymers thereof with dienes, can be prepared using procedures similar to those for polyethylene and other polyolefins; for instance, by the polymerization reaction of a mixture of ethylene and propylene, and optionally, e.g., butadiene, in the presence of a Ziegler type catalyst (e.g., transition metal compound and organometallic compound), or by free radical initiation under high pressures.

Polymers based on still higher olefins are not as readily available and, therefore, not as preferred. Examples of such higher polyolefins are polymers based on 3-methyl-1-butene($H_2C=CHCH(CH_3)_2$). 1-pentene($H_2C=CHCH_2CH_2CH_3$); and 4-methyl-1-pentene ($H_2C=CHCH_2CH_2-(CH_3)_2$). They can be prepared by known procedures including those described in The Encyclopedia of Polymer Science and Technology, John Wiley & Sons, Inc., Volume 9, pages 440-460 (1965).

As indicated, component (c) can be a polymerization product of acrylic comonomers or an acrylic monomer and a diene rubber alone, or with styrene. Preferably, this type will comprise (i) from 20 to 80% by weight of a backbone polymer made up of butadiene units or of butadiene and styrene units, (ii) from 80 to 20% by weight of an acrylic monomer which has been interpolymerized (e.g., "grafted") to (i); and (iii) from 0 to 60% by weight of a styrene monomer interpolymerized (1) sequentially or simultaneously with the interpolymerization of (2). The acrylic monomer is typically selected from lower alkyl methacrylates, alicyclic methacrylates and alkyl acrylates.

The polymerization product can be prepared by known techniques, and generally by conventional emulsion polymerization procedures. In one procedure, which is preferred, from 55 to 85 parts by weight, and preferably as much as 75 parts by weight, of a monomeric methyl methacrylate in admixture with another monomer copolymerizable therewith, such as ethyl acrylate, acrylonitrile, vinylidene chloride, styrene or a similar unsaturated compound containing a single vinylidene group, is added to 15 to 35 parts by weight of solids in a styrene-butadiene copolymer latex. The latex will normally comprise about 10 to 50 percent by weight of styrene and from 90 to 50 percent by weight of butadiene, with the molecular weight falling within the range of about 25,000 to 1,500,000. Interpolymerization of the acrylic or monomer mixture with the copolymer solids of the latex is brought about in the presence of a free radical generating catalyst, e.g., a peroxide, and a chain transfer agent, e.g., organic sulfur compound, and at a temperature between 15 to 80° C. Coagulation of the grafted product is effected by means, for instance, of a calcium chloride solution, after which the product is filtered, washed and dried.

Further details regarding this preparation procedure are found in U.S. Pat. Nos., 2,857,360 and 2,943,074 (both to Seymour S. Feuer). A preferred commercially available material is Acryloid KM 611, manufactured by the Rohm and Haas Company of Philadelphia, Pennsylvania.

Also employable for component (c) are more complex polymeric materials which have been described in the art, e.g., in U.S. Pat. No. 4,096,202 (Farnham, et al.), as multiphase composite acrylic interpolymers of a first elastomeric phase and a rigid thermoplastic final phase. These have sometimes been referred to as being of the "coreshell" type, comprising a cross-linked alkyl acrylate rubber core and an alkyl methacrylate outer shell.

More specifically, such interpolymers will comprise a first, elastomeric phase which has been prepared by polymerizing a mixture of a major amount of a $C_{1-6}$ alkyl acrylate, and minor amounts of a cross-linking monomer and a graft-linking monomer, and a final rigid thermoplastic phase which has been polymerized in the presence of the elastomeric phase.

Preferably, the interpolymer comprises from about 25 to about 95 percent by weight of the elastomeric phase, and from about 75 to about 5 percent by weight of rigid thermoplastic phase; and moreover, the elastomeric phase has been polymerized from a monomer system comprising from about 75 to about 99.8 percent by weight of a $C_{1-6}$ alkyl acrylate, from about 0.1 to about 5 percent by weight of a cross-linking monomer, and from about 0.1 to about 5 percent by weight of a graft-linking monomer.

Useful as crosslinking monomers are polyacrylic and polymethacrylic esters of polyols, such as butylene diacrylate, butylene dimethacrylate, trimethylol propane trimethacrylate, and the like; di- and trimethyl benzene, vinyl acrylate and vinyl methacrylate. The preferred crosslinking monomer is butylene diacrylate.

The graft-linking monomer is a polyethylenically unsaturated compound having a plurality of addition polymerizable reactive groups, or "sites", at least one of which polymerizes at a substantially different rate from one or more of the other reactive groups. The function of this component is to provide a residual level of unsaturation in the elastomeric phase, and especially during the later stages of polymerization. Examples of such graftlinking monomers are allylic compounds such as allyl esters of ethylenically unsaturated acids, including allyl acrylate, allyl methacrylate, diallyl maleate, diallyl, fumarate, diallyl itaconate, allyl acid maleate, allyl acid fumarate, and allyl acid itaconate. Preferred are allyl methacrylate and diallyl maleate.

An especially preferred interpolymer is composed of a first stage comprising an elastomeric polymer which has been polymerized from a monomer mixture of 95 to 99.8 percent by weight of butyl acrylate, 0.1 to 2.5 percent by weight of butylene diacrylate cross-linking agent, and 0.1 to 2.5 percent by weight of allyl methacrylate or diallyl maleate graft-linking agent, and a final (outer) stage which has been polymerized from methyl methacrylate.

The aforementioned interpolymers can be prepared by procedures described in the patent literature, for instance, in the above-identified Farnham, et al. patent. A commercially available material useful in this invention is Acryloid KM 330, manufactured by the Rohm and Haas Company.

Widely variant proportions of (a), (b) and (c) are possible in the present compositions. Illustratively, the compositions can be formulated to provide in excess of 30 percent by weight of the olefin homopolymer or copolymer, based on the combined weight of (a) and (b). This marks a sharp departure from prior art blends, which in the typical case can tolerate only up to about 10 percent of the olefin polymer without undesirable losses in the ductility of the molded article due to only partial compatibility with the polycarbonate resin.

Component (c) need be present only in minor amounts to effect the described improvement in stress cracking resistance, i.e., in less than 50% by weight based on (a), (b) and (c). In general, amounts of between about 1 and about 15 parts by weight for every 100 parts of (a), (b) and (c) combined will suffice to confer the described beneficial effect. Amounts in excess of this are permissible but do not normally provide any further property enhancement.

In addition to the essential ingredients which have just been described, the compositions may and often do contain one or more additives conventionally employed in polycarbonate resins and resin blends. These additives are selected generally from among fillers and/or reinforcing agents, flame retardant and/or drip retardant agents, thermal or UV stabilizers, antioxidants, dyes, pigments, and so forth.

Examples of fillers and/or reinforcements include clays, wollastonite, titanium dioxide, mica, talc, titanate whiskers, calcium silicate, calcium sulfate, filamentous carbon, and glass flakes or fibers. These materials, when present, are usually included in amounts of from about 1 to about 60 parts by weight of the total composition. The other additives, such as flame retardant agents, especially metal salts of organic sulfonic acids, drip retardant agents, stabilizers, antioxidants, etc., will normally be included in amounts of from about 1 to about 25% by weight of the composition.

The compositions may be prepared by a procedure in which the ingredients are dry (tumble) blended, passed through a twin screw extruder at a temperature of from about 255 to about 295° C., collected, chopped into molding pellets and injection molded at a temperature of from about 255 to about 285° C. Alternatively, the ingredients can be solution or melt blended instead of dry blended during the initial stage of preparation, which may avoid the need for compounding the blend in an extruder prior to molding. In either case, a molded article results which possesses mechanical properties characteristic of polycarbonate resins and blends generally and has the additional advantage of good impact strength in thicker sections together with greater resistance toward embrittlement on exposure to gasoline.

The resistance to environmental stress crazing and cracking of the polycarbonate resin mixtures prepared in accordance with the invention was determined by subjecting stressed specimens to gasoline soaking and then measuring their impact strengths with special attention to their mode of failure, ductile failure being preferable. The specimens are ASTM D-256 impact test bars of two sizes: $2\frac{1}{2}'' \times \frac{1}{2}'' \times \frac{1}{8}''$ and $2\frac{1}{2}'' \times \frac{1}{2}'' \times \frac{1}{4}''$. Values of the desired stress were applied to each test bar by mounting on an ASTM stress jig (1 percent strain). The mounted bars were soaked 24 hours at room temperature in AMOCO ® unleaded premium gasoline. They were removed from the jig, the gasoline evaporated and the bars dried for 24 hours. Izod impact strengths were then determined according to ASTM D-256 procedures on notched specimens. In most cases, the properties are compared with those of identical unsoaked, molded mixtures. Those which retain a substantial amount of impact resistance after soaking are obviously the best at resisting environmental stress cracking.

DESCRIPTION OF THE SPECIFIC EMBODIMENTS

The following examples illustrate the invention. These are included for instructive purposes only and to show preferred or best embodiments, but they are not intended to be limiting.

EXAMPLES 1–2

Compositions in accordance with the invention are prepared by preblending the ingredients, extruding at a temperature of 280° C. and injection molding into test bars at a temperature of 290° C. (unless shown otherwise). The compositions and physical properties are reported in the Table on the following page.

TABLE 1

| Example | A* | B* | C* | 1 | 2 |
|---|---|---|---|---|---|
| Components, parts by weight | | | | | |
| Poly(bisphenol A carbonate) resin (LEXAN ®, General Electric Co.) | 85 | 96 | 86.6 | 80 | 70 |
| Polypropylene resin (PP1012, Exxon Corp.) | — | 1 | 9.6 | 10 | 20 |
| Ethylene-propylene copolymer (25/75, Profax 8623, Hercules Chemicals) | 10 | — | — | — | — |
| Acrylic interpolymer, (KM 330, Rohm & Haas Co.) | 5 | 3 | — | 10 | 10 |
| Acrylic interpolymer, (KM 611, Rohm & Haas Co.) | — | — | 3.8 | — | — |
| Properties | | | | | |
| Before Gasoline Soaking | | | | | |
| Notched Izod impact strength, ft. lbs./in. | | | | | |
| ⅛ inch sample | 11.3 | 14.6 | 13.2 | 6.7 | 4.0 |
| ¼ inch sample | 7.7 | 10.0 | 9.2 | 6.7 | 4.0 |
| After Gasoline Soaking | | | | | |
| Notched Izod impact strength, ft. lbs./in. | | | | | |
| ⅛ inch sample | 0.8° | 0.4° | 1.0° | 4.7 | 4.0 |

*Control experiments, superscript denotes percent ductility on a 5-bar test set. Thus, in this case, superscript ° means brittle failure. No superscript means 100% ductile at failure.

The substantial improvement in resistance to gasoline soaking provided by the present compositions is shown in the examples. Polycarbonate alone fails the gasoline soaking test.

EXAMPLE 3

The procedure of the previous examples was repeated to prepare the following molded compositions, with the results shown.

TABLE 2

| Example | D* | E* | F* | 3 |
|---|---|---|---|---|
| Components, parts by weight | | | | |
| Poly(bisphenol A carbonate) resin (LEXAN ®) | 90 | 96 | 90 | 86 |
| Polypropylene resin (PP1012, Exxon Corp.) | 4 | 4 | 10 | 10 |
| Acrylic interpolymer (KM 330, Rohm & Haas Co.) | 4 | — | — | 3 |
| Ethylene-ethyl acrylate copolymer (DPD-6169, Union Carbide) | 2 | — | — | 1 |
| Properties | | | | |
| Before Gasoline Soaking | | | | |
| Notched Izod impact strength, ft. lbs./in. | | | | |
| ⅛ inch sample | 11.6 | 14.3 | 12.4 | 7.4 |
| ¼ inch sample | 10.8 | 10.4 | 8.8 | 8.8 |
| After Gasoline Soaking | | | | |
| Notched Izod impact strength, ft. lbs./in. | | | | |
| ⅛ inch sample | 2.06° | 0.9° | 0.9° | 5.9 |

*Control experiments, see footnote to Table 1.

In contrast with the controls, which do not resist gasoline too well, the compositions of this invention show marked retention of impact resistance after soaking.

The above-mentioned patents and/or publications are incorporated herein by reference. Obviously, other modifications and variations are possible in the light of the above disclosure. For instance, other polycarbonate resins can be substituted for bisphenol A polycarbonate. Besides polypropylene and ethylenepropylene copolymers, other olefin resins can be used, such as polyethylene, and linear low density polyethylene. It is to be understood, therefore, that changes may be made in the particular embodiments shown which are still within the scope of the invention defined in the appended claims.

I claim:

1. A thermoplastic composition, comprising an intimate blend of
   (a) a major proportion of an aromatic polycarbonate resin;
   (b) at least about 10.4 parts by weight of a polyolefin or an olefin copolymer resin per 100 parts by weight of (a) and (b) combined; and
   (c) a third polymeric component comprising (i) a polymerization product of acrylic comonomers, or an acrylic monomer with a diene rubber, alone, or including styrene or
(ii) a multiphase interpolymer of a first elastomeric phase comprising an acrylic rubber and a rigid thermoplastic final phase, or
(iii) a mixture of (i) and (ii), the amount of (c) being at least sufficient to impart to the blend a resistance to environmental stress cracking and crazing greater than that possessed by (a) and (b) together.

2. A composition according to claim 1, in which component (b) is present in an amount of from about 10.4 to about 45 parts by weight per 100 parts by weight of (a) and (b) combined.

3. A composition according to claim 1, in which the aromatic polycarbonate resin has the formula

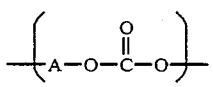

wherein A is a divalent aromatic radical of a dihydric phenol.

4. A composition according to claim 1, in which the aromatic polycarbonate resin has the formula

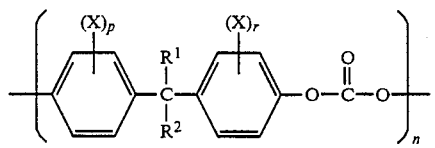

wherein $R^1$ and $R^2$ are, independently, hydrogen, alkyl having from 1 to about 10 carbon atoms, or phenyl; X is, independently, alkyl having from 1 to about 10 carbon atoms, chloro, bromo or hydrogen; p and r are independently, from 0 to 4; and n represents the total number of monomer units and is an integer of at least about 30.

5. A composition according to claim 1, in which the aromatic polycarbonate resin is poly(bisphenol A carbonate).

6. A composition according to claim 1, in which the component (b) is selected from the group consisting of polyethylene, polypropylene, polyisobutylene, and copolymers of ethylene and alpha-olefins, copolymers of ethylene and alkyl acrylates, terpolymers of ethylene, propylene and a diene, and mixtures of any of the foregoing.

7. A composition according to claim 1, in which component (b) comprises polypropylene.

8. A composition according to claim 1, in which component (b) comprises a copolymer of ethylene and propylene.

9. A composition according to claim 1, in which component (b) comprises a copolymer of ethylene and ethyl acrylate.

10. A composition according to claim 1, in which component (c) (i) comprises (i) from 20 to 80 parts by weight of a polybutadiene or poly(butadiene-styrene), (ii) from 80 to 20 parts by weight of an acrylic monomer which has been interpolymerized with (i), and (iii) from 0 to 60 parts by weight of a styrene monomer interpolymerized (1) sequentially or simultaneously with the interpolymerization of (2) per 100 parts by weight of (i), (ii) and (iii) combined.

11. A composition according to claim 1, in which component (c) (ii) is a multiphase polymer composed of a first stage comprising an elastomeric polymer which has been polymerized from a monomer mixture of 95 to 99.8 parts by weight of butyl acrylate, 0.1 to 2.5 parts by weight of butylene diacrylate and 0.1 to 2.5 parts by weight of allyl methacrylate or diallyl maleate per 100 parts by weight of said first stage, and a final stage which has been polymerized from methyl methacrylate.

12. A composition according to claim 1, wherein a reinforcing amount of a filler is present.

13. A composition according to claim 12, wherein said filler comprises glass fiber.

14. A composition according to claim 1, wherein a flame-retardant effective amount of a metal salt of an organic sulfonic acid is present.

15. An article which has been molded from a composition according to claim 1, said article being characterized by improved resistance to environmental stress cracking and crazing in comparison with a corresponding article without component (c).

16. A composition in accordance with claim 1 wherein the third polymeric component is (c) (ii).

* * * * *